(12) United States Patent
Berengoltz et al.

(10) Patent No.: US 11,900,366 B2
(45) Date of Patent: Feb. 13, 2024

(54) SYSTEM AND METHOD FOR SECURING CRYPTO-ASSET TRANSACTIONS

(71) Applicant: Fireblocks Ltd., Tel Aviv-Jaffa (IL)

(72) Inventors: Pavel Berengoltz, Petah-Tikva (IL); Idan Ofrat, Ganey Tikva (IL); Michael Shaulov, Tel Aviv-Jaffa (IL)

(73) Assignee: FIREBLOCKS LTD., Tel Aviv-Jaffa (IL)

(*) Notice: Subject to any disclaimer, the term of this patent is extended or adjusted under 35 U.S.C. 154(b) by 18 days.

(21) Appl. No.: 17/172,794

(22) Filed: Feb. 10, 2021

(65) Prior Publication Data

US 2021/0224797 A1 Jul. 22, 2021

Related U.S. Application Data

(63) Continuation of application No. PCT/US2019/048087, filed on Aug. 26, 2019.

(60) Provisional application No. 62/723,162, filed on Aug. 27, 2018.

(51) Int. Cl.
| | |
|---|---|
| *G06Q 20/36* | (2012.01) |
| *G06Q 20/38* | (2012.01) |
| *G06Q 20/40* | (2012.01) |
| *H04L 9/00* | (2022.01) |
| *H04L 9/06* | (2006.01) |
| *H04L 9/32* | (2006.01) |

(52) U.S. Cl.
CPC ..... *G06Q 20/3825* (2013.01); *G06Q 20/3827* (2013.01); *H04L 9/0643* (2013.01); *H04L 9/3247* (2013.01); *H04L 9/50* (2022.05); *H04L 2209/56* (2013.01)

(58) Field of Classification Search
CPC .......... G06Q 20/3825; G06Q 20/3827; G06Q 20/3829; G06Q 20/401; G06Q 20/3672; G06Q 2220/00; G06Q 20/36; H04L 9/0643; H04L 9/3247; H04L 9/50; H04L 2209/56
USPC .......................................... 705/44
See application file for complete search history.

(56) References Cited

U.S. PATENT DOCUMENTS

| | | | |
|---|---|---|---|
| 6,170,058 B1* | 1/2001 | Kausik ................. | G07F 7/1025 713/193 |
| 9,036,818 B2* | 5/2015 | Yoon .................... | H04L 9/3006 380/285 |
| 2015/0262171 A1* | 9/2015 | Langschaedel .... | G06Q 20/3829 705/71 |

(Continued)

FOREIGN PATENT DOCUMENTS

WO 2017145019 A1 8/2017

OTHER PUBLICATIONS

The International Search Report and the Written Opinion of the International Searching Authority for PCT/US2019/048087, dated Dec. 12, 2019, ISA/RU, Moscow, Russia.

*Primary Examiner* — Clifford B Madamba
(74) *Attorney, Agent, or Firm* — M&B IP Analysts, LLC

(57) ABSTRACT

A system and method for securing crypto-asset transactions. The method includes sharding a wallet private key such that each shard of the wallet private key is distributed to a different secure module; generating signatures by each of the different secure modules based on a respective shard of the sharded wallet private key and obtained trading platform credentials; and verifying the crypto-asset transaction when a predetermined threshold of the generated signatures are determined to match each other.

21 Claims, 6 Drawing Sheets

(56) References Cited

U.S. PATENT DOCUMENTS

2016/0085955 A1 3/2016 Lerner
2017/0005804 A1 1/2017 Zinder
2017/0046652 A1 2/2017 Haldenby et al.
2017/0091756 A1 3/2017 Stern et al.

\* cited by examiner

SYSTEM AND METHOD FOR SECURING CRYPTO-ASSET TRANSACTIONS

CROSS-REFERENCE TO RELATED APPLICATIONS

This application is a continuation of International Application No. PCT/US2019/048087, filed Aug. 26, 2019, which claims the benefit of U.S. Provisional Application No. 62/723,162 filed on Aug. 27, 2018, the contents of which are hereby incorporated by reference.

TECHNICAL FIELD

The present disclosure relates generally to cryptocurrency, and more specifically, to a method of securely completing cryptocurrency transactions between a trading platform, a blockchain network, and a crypto wallet.

BACKGROUND

In October 2008, the Bitcoin white paper was published by a pseudonymous author, Satoshi Nakamoto, which described a decentralized network for the transfer of an electronic currency named Bitcoin. The paper described the Bitcoin protocol and a blockchain network over which transactions occur using direct peer-to-peer transfers without the need of a trusted middle third party. A solution to a main problem presented, that of double-spending, was proposed using a distributed ledger over the peer-to-peer network. The distributed ledger ensures that a trail of all transactions is publicly available, making double spending impossible unless a majority of those verifying transactions are colluding, thus ensuring a secure system. This system has since been expanded to various other crypto-assets, whose current market capitalization reaches into the hundreds of billions of dollars. As the market has grown, crypto-assets are now traded not only by private investors, but by larger investments entities as well, such as hedge funds having significant crypto-asset portfolios. These funds trade these assets on a regular basis, with an aggregated daily trade volume of billions of dollars.

Crypto-assets are often made accessible through wallets, a software component that contains a unique public address and a matching private-public cryptography key pair, which are used for signing and verifying transactions over a blockchain network. Thus, the assets themselves are not stored in the wallet, but rather access to the private key, which is known only to the owner of the wallet, allows the transfer of assets over the blockchain from the wallet owner to other addresses of intended recipients. The blockchain records allow wallets to calculate a spendable balance to ensure the assets are verifiably owned by the wallet owner.

In order to transfer assets from one user to another, both the sender and the recipient must have such a wallet. In many cryptocurrency transactions a digital currency trading platform (DCE) (or trading platform) is utilized. A trading platform is an online platform for transferring crypto-assets from one user to another, for exchanging one cryptocurrency for another cryptocurrency, or for exchanging a cryptocurrency for fiat money, and vice versa. When conducting transactions over a trading platform, the trading platform's wallet is used to complete the transaction, after which a secondary transaction occurs between the trading platform and the sender or the recipient.

A compromise of the private key by a malicious entity could potentially result in the theft of the assets held in the wallet, usually by transferring these assets to another wallet controlled by the malicious entity. Due to the unsecure nature of many online wallets, as well as to a series of incidents of unauthorized access resulting in the theft and loss of billions of dollar worth of assets from crypto-asset trading platforms, many trading platforms do not provide liability for assets held in their wallets for the traders they serve. Thus, as a security measure, traders working with trading platforms aim to leave assets with the trading platform for as little time as possible, and withdraw them to their own wallets at the end of a trading operation.

However, certain risks remain. An attack on the trading platform when it is in custody of crypto-assets, an attack on a trader's wallet, and an attack during a transfer between the trading platform and the trader's wallet all present opportunities for a malicious entity to reroute the traded crypto-assets.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for securing crypto-asset transactions, including: sharding a wallet private key such that each shard of the wallet private key is distributed to a different secure module; generating signatures by each of the different secure modules based on a respective shard of the sharded wallet private key and obtained trading platform credentials; and verifying the crypto-asset transaction when a predetermined threshold of the generated signatures are determined to match each other.

Certain embodiments disclosed herein also include a non-transitory computer readable medium having stored thereon instructions for causing a processing circuitry to perform a process, the process including: sharding a wallet private key such that each shard of the wallet private key is distributed to a different secure module; generating signatures by each of the different secure modules based on a respective shard of the sharded wallet private key and obtained trading platform credentials; and verifying the crypto-asset transaction when a predetermined threshold of the generated signatures are determined to match each other.

Certain embodiments disclosed herein also include a system for securing crypt-asset transactions, including: a processing circuitry; and a memory, the memory containing instructions that, when executed by the processing circuitry, configure the system to: shard a wallet private key such that each shard of the wallet private key is distributed to a different secure module; generate signatures by each of the different secure modules based on a respective shard of the sharded wallet private key and obtained trading platform credentials; and verify the crypto-asset transaction when a predetermined threshold of the generated signatures are determined to match each other.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
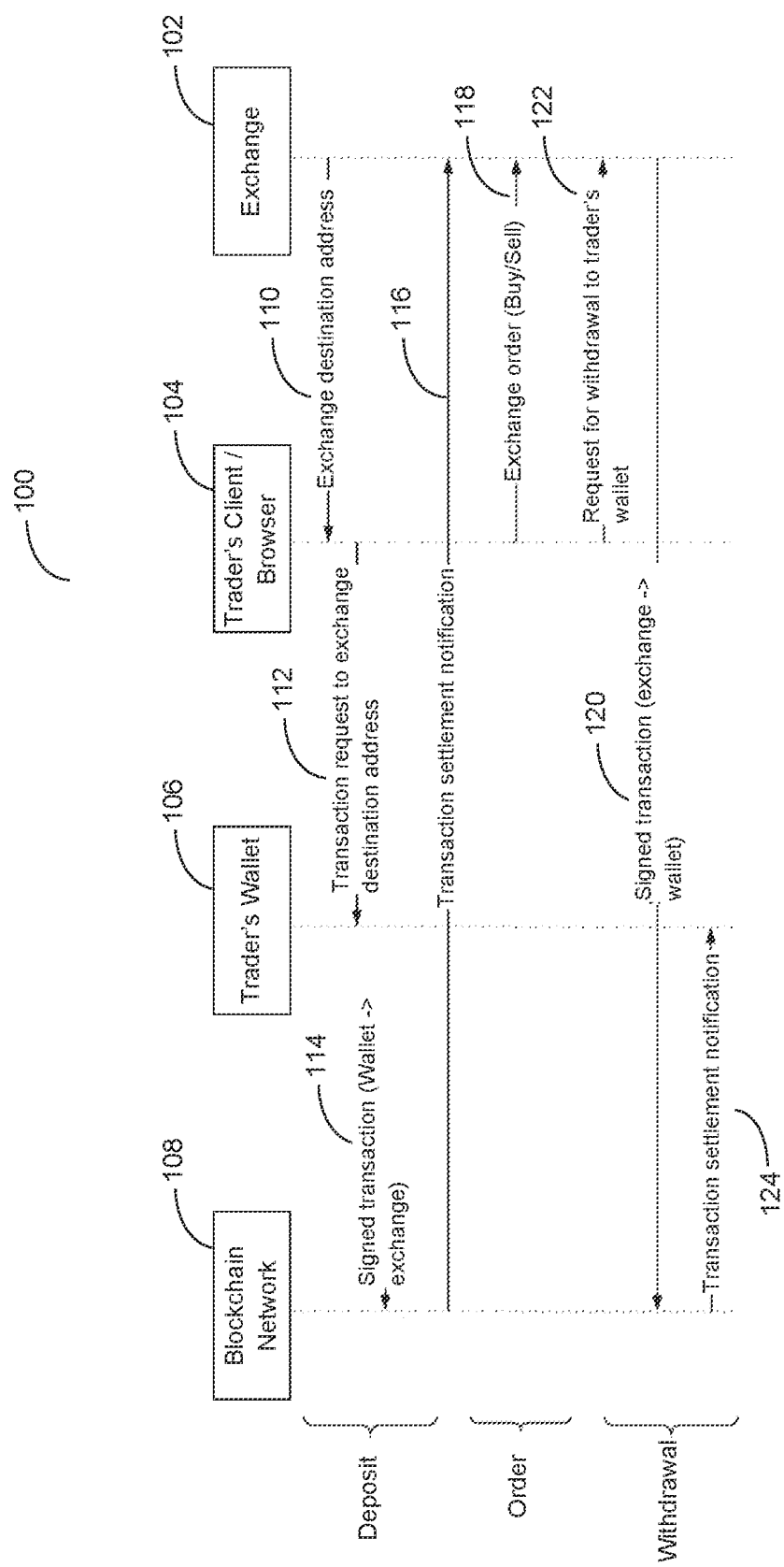
FIG. 1 is a flow diagram of an example crypto-asset trade involving a trader transacting over a blockchain network using a trading platform.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example flow diagram 100 of an example crypto-asset trade involving a trader transacting over a blockchain network using a trading platform 102. It should be noted that the term "trading platform" used herein includes cryptocurrency exchanges, liquidity providers, various forms of trading platforms, third party wallet services, and the like. The trader first sends a query for the trading platform's destination address 110, and generates a transaction for transferring assets from the trader's local wallet 106 to the trading platform's wallet 114. This query is sent and received 112 by the trader's client or browser 104. The transaction between the trader's wallet 106 and the trading platform 102 is completed and recorded 114 on the blockchain network 108. A transaction settlement notification 116 may be sent from the blockchain network to the trading platform to verify the transaction.

Next, the trading platform 102 issues an order 118 to sell the asset in trading platform for another asset, e.g., another form of crypto currency, fiat currency, and the like. As an example, another trader using the same trading platform may have placed a buy order for the crypto-asset being offered for sale. The trading platform identifies such a buyer and executes the sell/buy order. Once the order completes, a request 122 to withdraw from the trading platform's wallet to the trader wallet is received, and the trading platform asset is transferred back to the original trader's local wallet 106. A signed transaction 120 between the trading platform and the trader's wallet is recorded on the blockchain network and a transaction settlement notification may be sent from the blockchain network to the trader's wallet 124 to verify the transaction.

This flow presents several security risks. First, as described above, an attack may be executed directly on the trading platform. An attacker may be able to steal assets held by the trading platform in the short time frame between the initial deposit by the trader and the withdrawal back to the local wallet. As most retail trading platforms are not liable for the assets, this will result in a direct loss to the trader.

Second, an attack may compromise the trader's local wallet, which may lead to the theft of the private key granting access to the trader's portfolio assets. Once such access is granted, the assets therein may be transferred to an attacker's wallet.

Finally, an attack may compromise the trader's client or browser, namely the software used by the trader to communicate with the trading platform. This may be carried out as a "man-in-the-middle" attack, where an attacker gains access to the trader's client and forges the destination address, either during a deposit or a withdrawal, in order to reroute the asset transfer to a third-party wallet. Further, credentials of the trading platform may be compromised, where an attacker gives an order to withdraw assets to his own wallet before the trader manages to withdraw them.

Figure 2A:
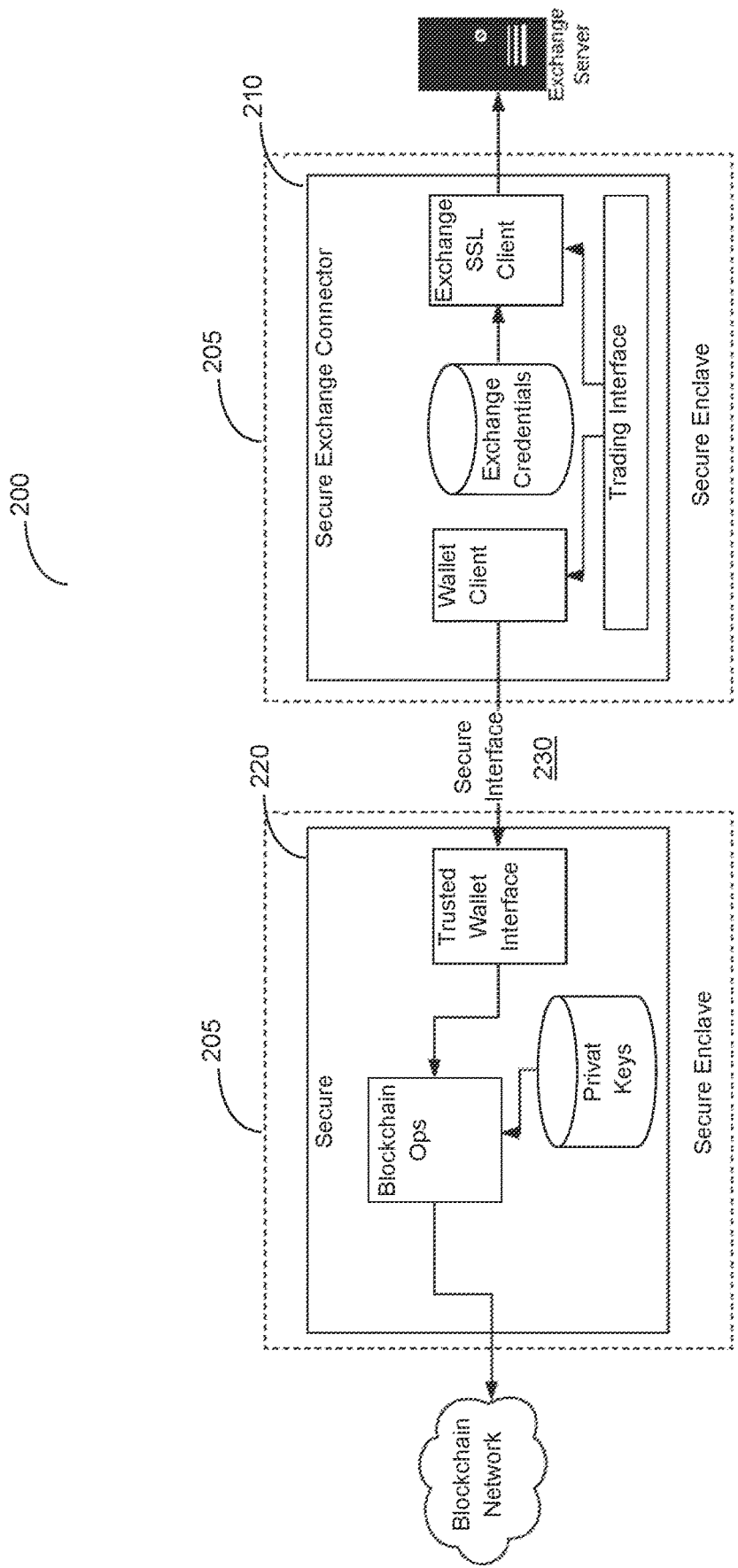
FIGS. 2A and 2B are block diagrams of a cyber-security system for securing blockchain trading platform transactions.

FIG. 2A is an example block diagram of a cyber-security system 200 for securing blockchain trading platform transactions according to an embodiment. The system 200 includes a software-based or mixed solution, based on Trusted Execution Environment (TEE) technology and modern cryptographic algorithms. A TEE is a secured area within a processor that is isolated from the main operating system and standard operating environment, ensuring enhanced protection when executing sensitive tasks. Examples of TEEs include, but are not limited to, Intel® SGX, ARM® TrustZone, and AMD® Secure Execution Environment.

In one embodiment, the system 200 is composed of two mutually-trusted components, each running inside a TEE, known as a secure enclave 205. The first component is a Secure Trading platform Connector 210, which is configured to run the entire trading operation against a trading platform. In an embodiment, the Secure Trading platform Connector 210 is configured to protect both the trading platform credentials by keeping them encrypted and accessible only to the TEE, and not a man-in-the-middle attack, by initiating and authenticating a secure connection. The system 200 further includes a secure wallet 220, which is configured to protect the private keys of a trader by keeping them encrypted and accessible only to the TEE. The secure wallet 220 is also configured to prevent any entity other than the trading interface from generating transactions by using a secure interface accessible only to the trading interface.

Figure 2B:
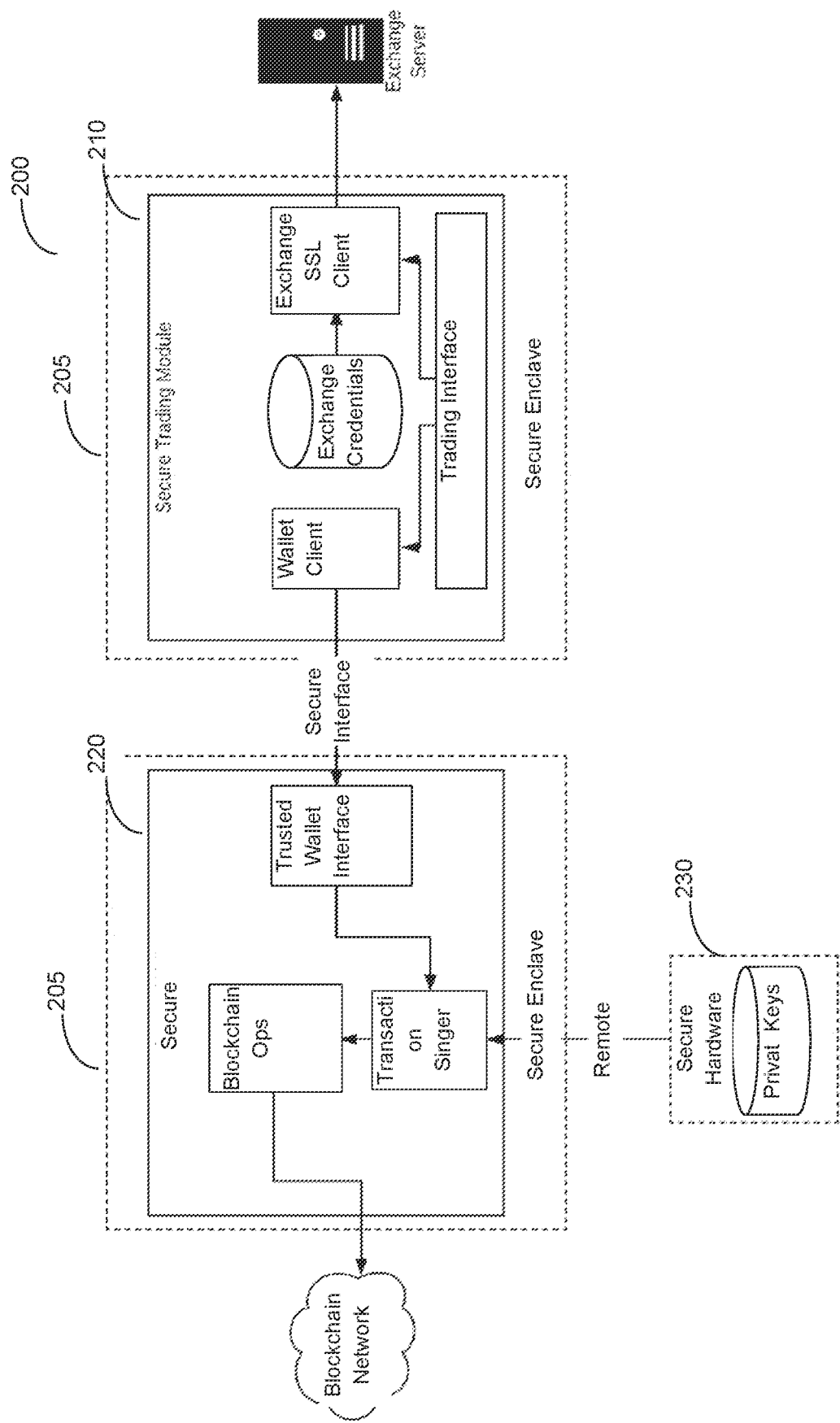

In an alternative embodiment, shown in FIG. 2B, of the cyber-security system 200, the private key of a trader is stored in a secure hardware component 230. The component 230 may include, for example, a hardware security module (HSM), a hardware wallet, such as a Ledger Nano or Trezor, and the like. In an example embodiment, the connection between the secure hardware component 230 and the secure wallet 220, is protected by mutual attestation and authentication. The access to the secure hardware wallet 230 is allowed only after proper authentication by trusted software. This enhancement is configured to prevent any possibility of an attacker acquiring access to private keys even if physical access to the wallet is obtained.

Figure 3:
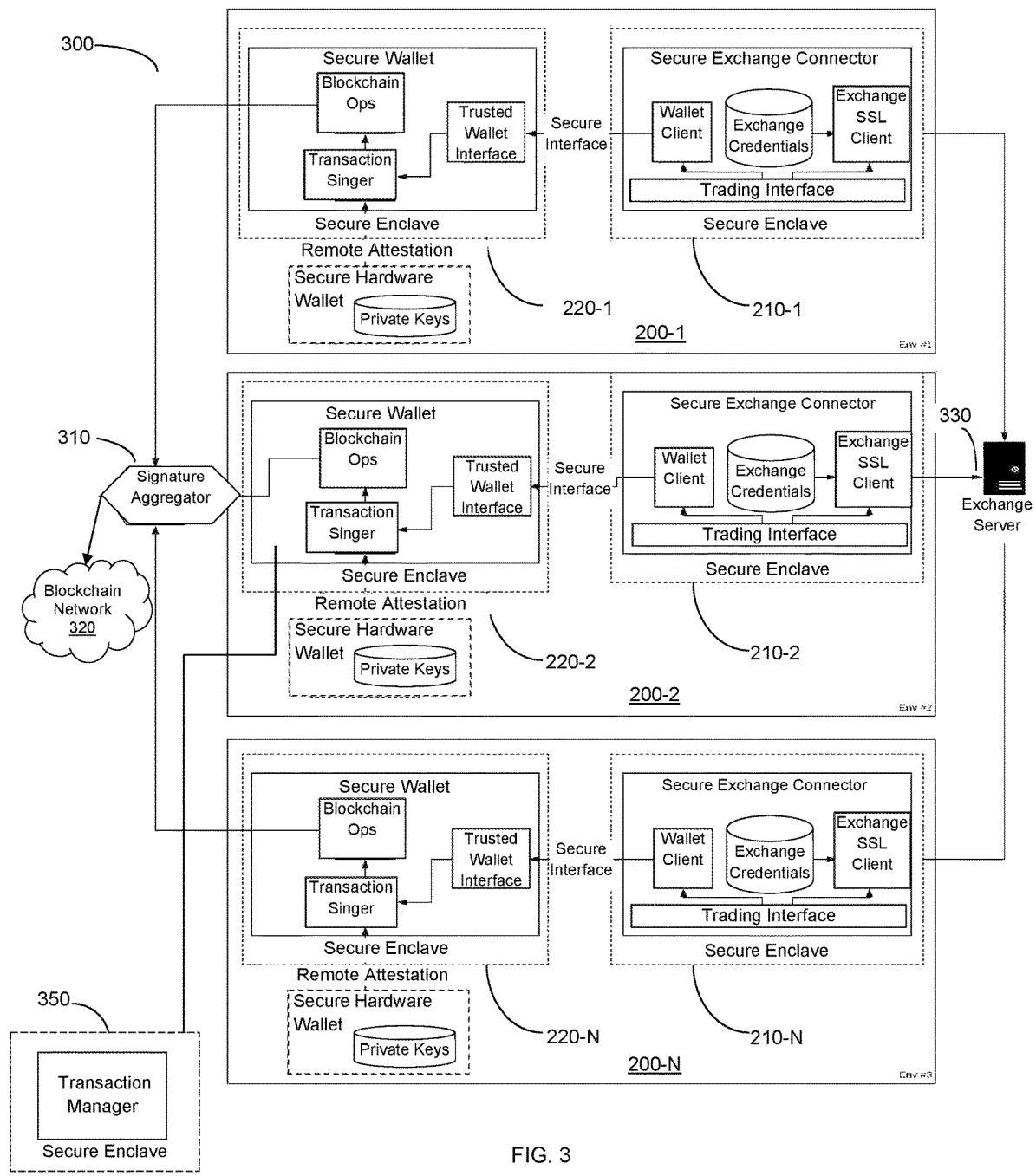
FIG. 3 is a block diagram of a system for securing crypto-asset transactions.

FIG. 3 is an example block diagram of a cyber-security system 300 for securing crypto-asset transactions according to an embodiment. An embodiment implements at least two such sub-systems of TEEs, namely secure modules 200-1 and 200-2, in various remote locations and in different environments. For example, some secure modules may be hosted on various cloud providers, e.g., Amazon® AWS®, Microsoft® Azure®, and the like, while at least one secure module may be executed on an on-premise computer or mobile device running the secure module components. Each of the secure modules 200-1, 200-2 is configured to operate separately, e.g., independently calculate destination addresses, initiate transactions and sign the transactions separately.

In this embodiment, the system 300 is configured to accept transactions by a blockchain network 320 if either all of the components or a majority thereof calculate the same destination address and sign the transaction with the correct private key. Otherwise, the system 300 is configured to prohibit the transactions from being recorded on the blockchain network 320.

In an embodiment, to accomplish this, at least one of a number of cryptographic implementations may be used. Such implementations include a multisignature (multisig) scheme, where it may be used if it is supported by the utilized blockchain network, and a secure multiparty computation (MPC) threshold signatures algorithm, and the like. It should be appreciated that such techniques allow for multiple parties, or TEEs, to run a computation on a series of inputs for which each party only knows one of the inputs.

It should be noted that while at a minimum two subsystems, secure modules 200-1 and 200-2, provide the disclosed security, more subsystems may be implemented, and the more subsystems that are implemented, the more secure the transaction will be, as it becomes more difficult for a malicious entity to forge a verified address. For example, secure modules 200-1 to 200-N may be employed, where N is an integer equal to or greater than 2.

In an embodiment, a transaction manager 350 is configured to send the command to initiate a transaction to sell assets from specific trading platform 330 to all secure modules 200-1 to 200-N. Each one of the secure modules 200-1 to 200-N is configured to calculate a trading platform destination address using its respective Secure Trading platform Connector 210-1 to 210-N and sign the entire transaction using its respective secure wallet 220-1 to 220-N with an environment-specific key. It should be noted that when the blockchain network 320 natively supports multiple signatures, the signature aggregator 310 collects the signature from each one of environments and publishes the aggregated signatures together. In an embodiment, each Secure Trading platform Connector 210 includes a shard of a wallet private key. In a further embodiment, the trading platform credentials held by the Secure Trading platform Connector 210 further includes a shard of a trading platform API Secret, as further discussed below in FIG. 4.

In an embodiment, when a blockchain network does not support multi-signatures, a signature aggregator 310 is utilized to aggregate the signed transactions from all secure modules 200-1 to 200-N, verify that the destination address is the same among the secure modules 200-1 to 200-N, that the required number of secure modules 200-1 to 200-N have properly signed the transaction, and sends the verified transaction to the blockchain network 320. In an embodiment, rather than requiring all signatures to be collected to send the verified transaction to the blockchain network, a predetermined threshold of signatures must be signed to verify the transaction.

Figure 4:
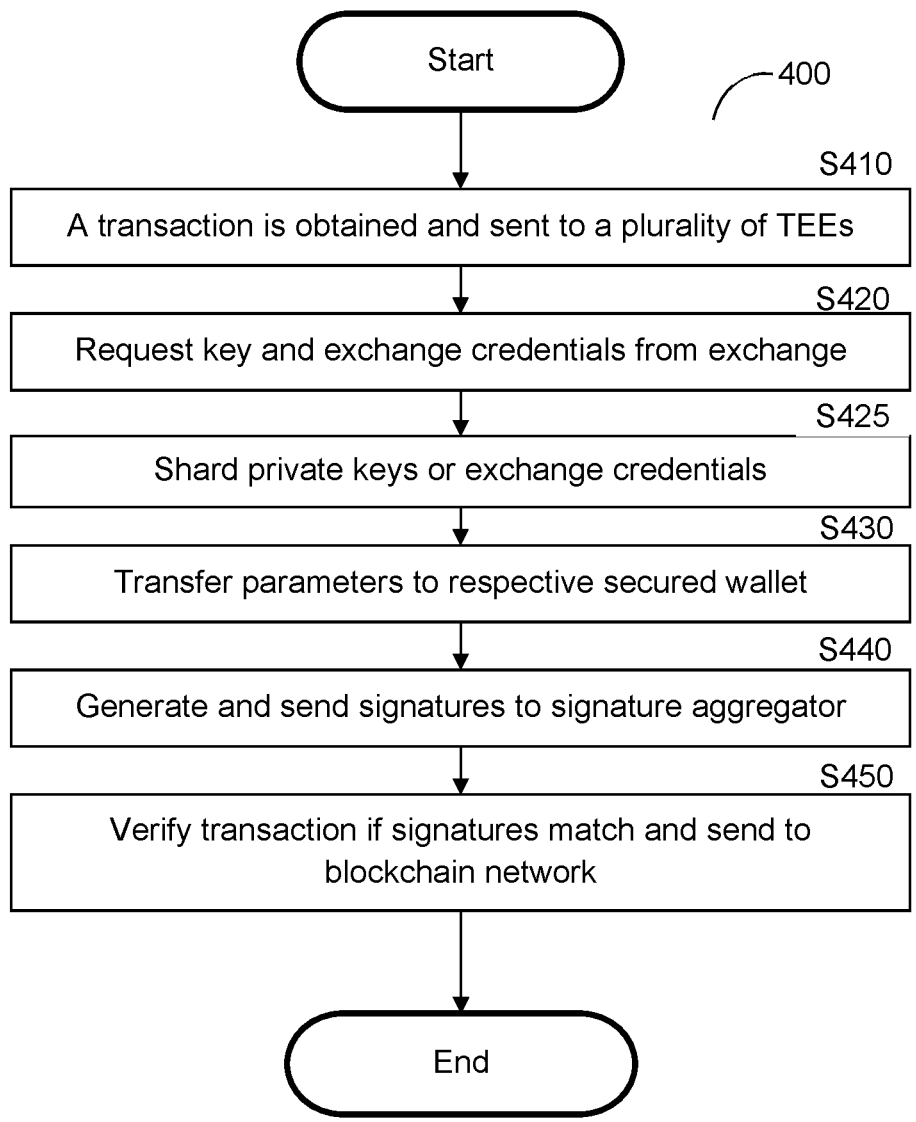
FIG. 4 is a flowchart of a method for securing crypto-asset transactions according to an embodiment.

FIG. 4 is an example flowchart of a method 400 for securing crypto-asset transactions according to an embodiment. The method may be performed by a cyber-security system, such as the system 300 of FIG. 3.

At S410, a crypto-asset transaction is obtained at each of a plurality of secure modules for verification. The transaction may be a sell request, and may include a request from a trader to execute the transaction through a trading platform. In an embodiment, the secure modules receive the transaction from a trader directly, e.g., through a trader client or browser. In another embodiment, the request is obtained from the trading platform. It should be noted that the trading platform does not initiate the verification process.

At S420, the public address and credentials of the trading platform is requested by each secure module in a subset of secure modules, e.g., secure modules 200-1 to 200-N of FIG. 3, selected to sign the transaction. In order to sign a transaction, the private keys relating to each secure module, e.g., a private key of a wallet within the secure module, in the subset of secure modules together with the trading platform credentials, e.g., the public address of the private key of the trading platform, are required. Each secure module signs a transaction independently using both its respective private key and the trading platform credentials. In an embodiment, secure modules signing a transaction are selected in a way that they are executed on different platforms. In one embodiment, a secure module of the customer participating in the transaction (e.g. deposit) is selected to be included in the subset of secure modules.

It should be noted that in cases of the deposit of assets to a trading platform's wallet, private keys of all secure modules are used to sign the transaction, while in cases of withdrawal of assets from a trading platforms, a public address is created from all keys and a trading platform application programming interface (API), request is initiated using API keys signed by matching API Secrets to transfer crypto-assets from the trading platform to the aforementioned public address. In a withdrawal scenario, the trading platform uses its own private keys.

At S425, the private key of a wallet is sharded, i.e., split up into smaller parts. These shards are distributed among the various secure modules, where each modules receive a single shard of a wallet private key. In a further embodiment, the trading platform credentials, e.g., the API Secret provided by the trading platform for signing API requests to the trading platform, is sharded as well and distributed to the various secure modules.

At S430, transaction parameters are sent to a secure wallet within the secure modules. The transaction parameters include parameters representative of the transaction that are used in a secure module. The transaction parameters may include the trading platform credentials, such as the public address or private key of the trading platform, the private key of a wallet, as well as information regarding the transaction itself, including the amount of crypto-assets requested to be sold and the trading platform to be used for the transaction.

At S440, a signature of the transaction, based on the transactions parameters, is generated by each secure module. The signatures of each secure module may be generated using the same hash. The secure wallet may request the secure hardware wallet to sign the transaction using a private key that is stored in the hardware wallet. It should be noted that the private key never leaves its stored location.

In an embodiment, a signature aggregator receives and compares each of the generated signatures from the plurality of secure modules. In an embodiment, the signature aggregator is accomplished using multiparty computation among the various secure modules. In a further embodiment, a private key of the wallet used for the transaction is first split up, or sharded, among the various secure modules, where each module received a single shard. A signature may be generated based on a shard. Each generated signature, or a predetermined threshold thereof, must match each other generated signature for transaction approval.

In an embodiment, the trading platform is accessed through an API where the trading platform API Secret may be sharded as well and distributed among the secure modules. Each secure module may hold only a single API Secret shard, or more than one API Secret shard. Each of the secure modules initiates an API request to the trading platform to obtain its deposit address, crafts a transaction from the wallet into that deposit address, and signs it using its key shard.

If each, or the predetermined threshold, of the signatures match, at S450, the transaction is verified, and the verified transaction is sent to the blockchain network. If there is at least one mismatch of signatures, an error is determined to have occurred, the transaction is not sent to the blockchain network, and execution terminates. In another embodiment, the transaction is verified if a predetermined threshold of signatures have been received and determined, by the signature aggregator, to match. The threshold may be all or less than all of the generated signatures.

It should be noted that unverified transactions are not posted on the blockchain. Thus, even when the aggregator is compromised and unverified transactions are posted on the blockchain, such transaction will be refused. This is due to a mismatch of the signatures, as a compromised aggregator does not hold enough matching signatures to verify a properly signed transaction to the blockchain.

Figure 5:
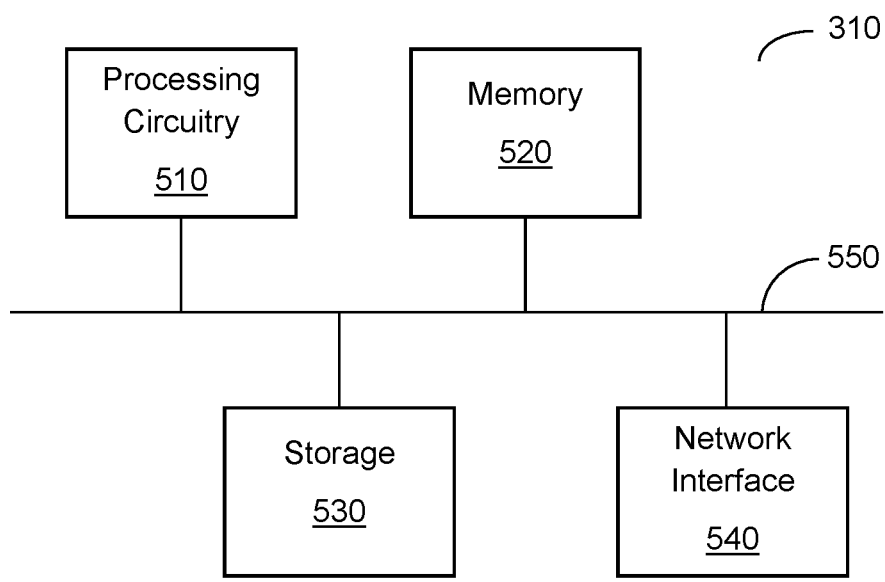
FIG. 5 is a block diagram of a signature aggregator.

FIG. 5 is an example block diagram of the signature aggregator 310 according to an embodiment. The signature aggregator 310 includes a processing circuitry 510 coupled to a memory 520, a storage 530, and a network interface 540. In an embodiment, the components of the signature aggregator 310 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

In another embodiment, the memory 520 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to signature aggregation for crypto-asset transactions, as discussed hereinabove. In a further embodiment, the memory 520 may further include a memory portion including the instructions.

The storage 530 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 530 may store communication consumption patterns associated with one or more communications devices.

The network interface 540 allows the signature aggregator 310 to communicate with the secure modules and trading platforms, in order to receive parameters and keys related to a desired crypto-asset transaction. The network interface 540 further allows the signature aggregator 310 to communicate with various blockchain networks.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for securing crypto-asset transactions, comprising:
   sharding, by a processing circuitry, a wallet private key such that each shard of the wallet private key is distributed to a different secure module;
   generating signatures by each of the different secure modules having access to corresponding trading platform credentials based on a respective shard of the sharded wallet private key and the corresponding trading platform credentials, wherein a secure module includes a secure trading platform connector and a secure wallet;

verifying a crypto-asset transaction associated with the wallet when the generated signatures are determined to match each other based on a pre-determined threshold;

calculating, by a secure module, a trading platform destination address using its respective secure trading platform connector; and signing, by a secure module, the verified crypto-asset transaction with an environment-specific key using its respective secure wallet, thereby enabling execution of the verified crypto-asset transaction by a trading platform addressed by the calculated destination address.

2. The method of claim 1, wherein the pre-determined threshold is all of the generated signatures.

3. The method of claim 1, further comprising:
aggregating the generated signatures.

4. The method of claim 3, wherein the aggregating is accomplished using multiparty computation.

5. The method of claim 1, wherein signatures of each secure module are generated with same hash.

6. The method of claim 1, wherein a crypto-asset transaction is a withdrawal of assets from the trading platform, wherein the method further comprises:

connecting, by the secure trading platform connector, to the trading platform through a trading platform application programming interface (API); and sharding a trading platform API Secret such that each shard of the trading platform API Secret is distributed to a different secure module.

7. The method of claim 6, wherein the generated signatures are generated based on the sharded trading platform API Secret.

8. The method of claim 1, wherein each secure module holds only a single shard.

9. The method of claim 1, further comprising:
sending the verified crypto-asset transaction to a blockchain network, and wherein the verified crypto-asset transaction is a deposit of assets.

10. The method of claim 1, further comprising:
requesting at least a wallet private key and trading platform credentials to execute a crypto-asset transaction.

11. A non-transitory computer readable medium having stored thereon instructions for causing a processing circuitry to perform a process, the process comprising:

sharding, by a processing circuitry, a wallet private key such that each shard of the wallet private key is distributed to a different secure module;

generating signatures by each of the different secure modules having access to trading platform credentials based on a respective shard of the sharded wallet private key and obtained trading platform credentials, wherein a secure module includes a secure trading platform connector and a secure wallet;

verifying a crypto-asset transaction associated with the wallet when the generated signatures are determined to match each other based on a pre-determined threshold;

calculating, by a secure module, a trading platform destination address using its respective secure trading platform connector; and signing, by a secure module, the verified crypto-asset transaction with an environment-specific key using its respective secure wallet, thereby enabling execution of the verified crypto-asset transaction by a trading platform addressed by the calculated destination address.

12. A system for securing crypto-asset transactions, comprising:

a processing circuitry; and a memory, the memory containing instructions that, when executed by the processing circuitry, configure the system to:

shard a wallet private key such that each shard of the wallet private key is distributed to a different secure module;

generate signatures by each of the different secure modules having access to trading platform credentials based on a respective shard of the sharded wallet private key and obtained trading platform credentials, wherein a secure module includes a secure trading platform connector and a secure wallet;

verify a crypto-asset transaction associated with the wallet when the generated signatures are determined to match each other based on a pre-determined threshold calculate a trading platform destination address using its respective secure trading platform connector; and sign the verified crypto-asset transaction with an environment-specific key using its respective secure wallet, thereby enabling execution of the verified crypto-asset transaction by a trading platform addressed by the calculated destination address.

13. The system of claim 12, wherein the pre-determined threshold is all of the generated signatures.

14. The system of claim 12, wherein the system is further configured to:
aggregate the generated signatures.

15. The system of claim 14, wherein the aggregating is accomplished using multiparty computation.

16. The system of claim 14, wherein signatures of each secure module are generated with same hash.

17. The system of claim 14, wherein a crypto-asset transaction is a withdrawal of assets from the trading platform, wherein the system is further configured to:

connect to the trading platform through a trading platform application programming interface (API); and shard a trading platform API Secret such that each shard of the trading platform API Secret is distributed to a different secure module.

18. The system of claim 17, wherein the generated signatures are generated based on the sharded trading platform API Secret.

19. The system of claim 12, wherein each secure module holds only a single shard.

20. The system of claim 12, wherein the system is further configured to:

send the verified crypto-asset transaction to a blockchain network, and wherein the verified crypto-asset transaction is a deposit of assets.

21. The system of claim 12, wherein the system is further configured to:

request at least a wallet private key and trading platform credentials to execute a crypto-asset transaction.

* * * * *